United States Patent
Liu

(10) Patent No.: US 10,033,417 B2
(45) Date of Patent: Jul. 24, 2018

(54) INTERFERENCE SIGNAL CANCELLATION APPARATUS AND METHOD

(71) Applicant: Huawei Technologies Co., Ltd., Shenzhen (CN)

(72) Inventor: Yu Liu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/827,388

(22) Filed: Nov. 30, 2017

(65) Prior Publication Data

US 2018/0083659 A1    Mar. 22, 2018

Related U.S. Application Data

(63) Continuation of application No. PCT/CN2015/080441, filed on May 30, 2015.

(51) Int. Cl.
*H04B 1/00* (2006.01)
*H04B 17/00* (2015.01)
(Continued)

(52) U.S. Cl.
CPC .............. *H04B 1/10* (2013.01); *H04B 1/7107* (2013.01); *H04B 15/02* (2013.01)

(58) Field of Classification Search
CPC .......... H04B 1/04; H04B 1/0475; H04B 1/10; H04B 1/40; H04B 1/525; H04B 7/15585;
(Continued)

(56) References Cited

U.S. PATENT DOCUMENTS 6,725,017 B2 * 4/2004 Blount ................... H04B 1/525
455/296
6,907,093 B2 * 6/2005 Blount ................... H04B 1/525
455/63.1
(Continued)

FOREIGN PATENT DOCUMENTS

| CN | 101222694 A | 7/2008 |
| CN | 103916148 A | 7/2014 |
| EP | 2802081 A1 | 11/2014 |

OTHER PUBLICATIONS

Machine Translation and Abstract of Chinese Publication No. CN101222694, Jul. 16, 2008, 8 pages.
(Continued)

*Primary Examiner* — Quochien B Vuong
(74) *Attorney, Agent, or Firm* — Conley Rose, P.C.

(57) ABSTRACT

An interference signal cancellation apparatus, includes a first power divider configured to divide a cancellation reference signal link corresponding to a transmit antenna into a first reference link and a second reference link. The apparatus includes a second power divider configured to divide a signal receiving link connected to a receive antenna into a first receiving link and a second receiving link, and use the first receiving link as an output link. The apparatus includes a primary cancellation unit that is located at the first reference link and that is connected to the signal receiving link by using a coupler. The apparatus includes a secondary cancellation unit that is located at the second reference link and that is connected to the second receiving link by using a coupler. The apparatus includes a control module connected to the second receiving link, the primary cancellation unit, and the secondary cancellation unit.

20 Claims, 10 Drawing Sheets

(51) Int. Cl.
*H04B 1/10* (2006.01)
*H04B 15/02* (2006.01)
*H04B 1/7107* (2011.01)

(58) Field of Classification Search
CPC ... H04B 15/00; H04B 17/345; H04W 72/042; H04L 5/1461
USPC .......... 455/63.1, 67.13, 69, 70, 296
See application file for complete search history.

(56) References Cited

U.S. PATENT DOCUMENTS

| | | | |
|---|---|---|---|
| 8,320,866 B2* | 11/2012 | Pratt | H04B 1/525 455/67.13 |
| 8,521,090 B2* | 8/2013 | Kim | H04B 1/525 455/296 |
| 9,634,823 B1* | 4/2017 | Hahn | H04L 5/14 |
| 2015/0311928 A1 | 10/2015 | Chen et al. | |

OTHER PUBLICATIONS

Foreign Communication From a Counterpart Application, PCT Application No. PCT/CN2015/080441, English Translation of International Search Report dated Feb. 24, 2016, 2 pages.
Foreign Communication From a Counterpart Application, PCT Application No. PCT/CN2015/080441, English Translation of Written Opinion dated Feb. 24, 2016, 6 pages.

\* cited by examiner

INTERFERENCE SIGNAL CANCELLATION APPARATUS AND METHOD

CROSS-REFERENCE TO RELATED APPLICATIONS

This application is a continuation of International Application No. PCT/CN2015/080441, filed on May 30, 2015, the disclosure of which is hereby incorporated by reference in its entirety.

TECHNICAL FIELD

The present disclosure relates to the field of communications technologies, and in particular, to an interference signal cancellation apparatus and method.

BACKGROUND

A key technical problem in radio and microwave communication is interference suppression and cancellation. In an existing communications system, a transmit antenna logically used for transmitting a signal and a receive antenna logically used for receiving a signal may physically be a same antenna or different antennas. However, although the transmit antenna and the receive antenna are physically different antennas, the transmit antenna and the receive antenna are generally relatively close to each other because a physical cabling layout of the communications system is limited. Therefore, in a same communications system, a transmitting link generally interferes with a receiving link, and a signal transmitted by the transmitting link is an interference signal for the receiving link.

In a conventional technology, to reduce interference of a transmitting link to a receiving link in a communications system, an interference cancellation unit is generally disposed to process a signal received by the receiving link, to cancel an interference signal included in the signal. As shown in FIG. 1, a power divider may divide a transmitted signal into two signals. One signal is sent by a transmit antenna to a remote end for transmission, and the other signal is inputted into an interference cancellation unit as a cancellation reference signal. As shown in FIG. 2, an interference cancellation unit subtracts a cancellation reference signal from a signal received by a receive antenna, to obtain a received signal without interference. Therefore, a signal-to-noise ratio is increased.

However, it is found by means of research that the interference signal cancellation apparatus and method in the conventional technology have at least the following problem: When performing interference cancellation on a received signal according to a cancellation reference signal, an interference cancellation unit generally needs to perform a parameter adjustment operation such as time shift, phase shift, or attenuation on the cancellation reference signal, so that the cancellation reference signal corresponds to a component of an interference signal in the received signal. Therefore, before a received signal without interference is obtained, because an operation process of time shift, phase shift, or attenuation is performed on the cancellation reference signal (that is, a power of the interference signal may firstly increase and then decrease), the interference signal in the received signal obtained by a receiver may be strengthened. Because an excessively strong interference signal may increase a bit error rate, communication is interrupted and consequently a communications system becomes unstable.

SUMMARY

Based on this, an interference signal cancellation apparatus is provided, to resolve the foregoing problem of insufficient reliability caused by the interference cancellation method in the conventional technology.

A first aspect of embodiments of the present disclosure provides an interference signal cancellation apparatus, including: a first power divider, configured to divide a cancellation reference signal link corresponding to a transmit antenna into a first reference link and a second reference link; a second power divider, configured to: divide a signal receiving link connected to a receive antenna into a first receiving link and a second receiving link, and use the first receiving link as an output link; a primary canceller located at the first reference link, connected to the signal receiving link by using a coupler, and configured to: receive a primary configuration parameter of a controller, and perform interference cancellation processing on a received signal on the signal receiving link according to the primary configuration parameter and a cancellation reference signal on the first reference link, to generate a first signal without interference that is transmitted on the signal receiving link; a secondary canceller located at the second reference link, connected to the second receiving link by using a coupler, and configured to: receive a secondary configuration parameter of the controller, and perform interference cancellation processing on a received signal on the second receiving link according to the secondary configuration parameter and a cancellation reference signal on the second reference link, to generate a second signal without interference that is transmitted on the second receiving link; and the controller, connected to the second receiving link, the primary canceller, and the secondary canceller, and configured to: generate the secondary configuration parameter; detect, after sending the secondary configuration parameter to the secondary canceller, a power value of the second signal without interference and a power value of the first signal without interference; determine, according to the power value of the second signal without interference and the power value of the first signal without interference, whether the secondary canceller can decrease the power value of the first signal without interference; if yes, generate an updated primary configuration parameter according to the secondary configuration parameter of the secondary canceller and the primary configuration parameter of the primary canceller; and send the updated primary configuration parameter to the primary canceller.

A second aspect of the embodiments of the present disclosure provides an interference signal cancellation method, including: dividing, by a first power divider, a signal on a cancellation reference signal link corresponding to a transmit antenna into a cancellation reference signal on a first reference link and a cancellation reference signal on a second reference link; dividing, by a second power divider, a signal on a signal receiving link connected to a receive antenna into a received signal on a first receiving link and a received signal on a second receiving link, and outputting the received signal on the first receiving link; receiving, by a secondary canceller, a secondary configuration parameter of a controller, and performing interference cancellation processing on the received signal on the second receiving link according to the secondary configuration parameter and the cancellation reference signal on the second reference link, to generate a second signal without interference that is transmitted on the second receiving link; detecting, by the controller, a power value of the second signal without interference and a power value of a first signal without interference: determining, according to the power value of the second signal without interference and the power value of the first signal without interference, whether the secondary canceller can decrease the power value of the first signal without interference; if yes, generating an updated primary configuration parameter according to the secondary configuration parameter of the secondary canceller and a primary configuration parameter of a primary canceller; sending the updated primary configuration parameter to the primary canceller; updating the secondary configuration parameter; and sending an updated secondary configuration parameter to the secondary canceller; and receiving, by the primary canceller, the primary configuration parameter of the controller, and performing interference cancellation processing on the received signal on the signal receiving link according to the primary configuration parameter and the cancellation reference signal on the first reference link, to generate the first signal without interference that is transmitted on the signal receiving link.

A third aspect of the embodiments of the present disclosure provides an interference signal cancellation apparatus, including: a first power divider, configured to divide a cancellation reference signal link corresponding to a transmit antenna into a first reference link and a second reference link; a second power divider, configured to divide a signal receiving link connected to a receive antenna into a first receiving link and a second receiving link; a primary canceller located at the first reference link, connected to the first receiving link by using a coupler, and configured to: receive a primary configuration parameter of a controller, and perform interference cancellation processing on a received signal on the signal receiving link according to the primary configuration parameter and a cancellation reference signal on the first reference link, to generate a first signal without interference that is transmitted on the signal receiving link, where the first signal without interference is an output signal; a secondary canceller located at the second reference link, connected to the second receiving link by using a coupler, and configured to: receive a secondary configuration parameter of the controller, and perform interference cancellation processing on a received signal on the second receiving link according to the secondary configuration parameter and a cancellation reference signal on the second reference link, to generate a second signal without interference that is transmitted on the second receiving link; and the controller, connected to the second receiving link, the primary canceller, and the secondary canceller, and configured to: generate the secondary configuration parameter; detect, after sending the secondary configuration parameter to the secondary canceller, a power value of the second signal without interference and a power value of the first signal without interference; determine, according to the power value of the second signal without interference and the power value of the first signal without interference, whether the secondary canceller can decrease the power value of the first signal without interference; if yes, generate an updated primary configuration parameter according to the secondary configuration parameter of the secondary canceller and the primary configuration parameter of the primary canceller; and send the updated primary configuration parameter to the primary canceller.

A fourth aspect of the embodiments of the present disclosure provides an interference signal cancellation method, including: dividing, by a first power divider, a signal on a cancellation reference signal link corresponding to a transmit antenna into a cancellation reference signal on a first reference link and a cancellation reference signal on a second reference link; dividing, by a second power divider, a signal on a signal receiving link connected to a receive antenna into a received signal on a first receiving link and a received signal on a second receiving link; receiving, by a secondary canceller, a secondary configuration parameter of a controller, and performing interference cancellation processing on the received signal on the second receiving link according to the secondary configuration parameter and the cancellation reference signal on the second reference link, to generate a second signal without interference that is transmitted on the second receiving link; detecting, by the controller, a power value of the second signal without interference and a power value of a first signal without interference: determining, according to the power value of the second signal without interference and the power value of the first signal without interference, whether the secondary canceller can decrease the power value of the first signal without interference; if yes, generating an updated primary configuration parameter according to the secondary configuration parameter of the secondary canceller and a primary configuration parameter of a primary canceller; sending the updated primary configuration parameter to the primary canceller; updating the secondary configuration parameter; and sending an updated secondary configuration parameter to the secondary canceller; and receiving, by the primary canceller, the primary configuration parameter of the controller, and performing interference cancellation processing on the received signal on the signal receiving link according to the primary configuration parameter and the cancellation reference signal on the first reference link, to generate the first signal without interference that is transmitted on the signal receiving link, where the first signal without interference is an output signal.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
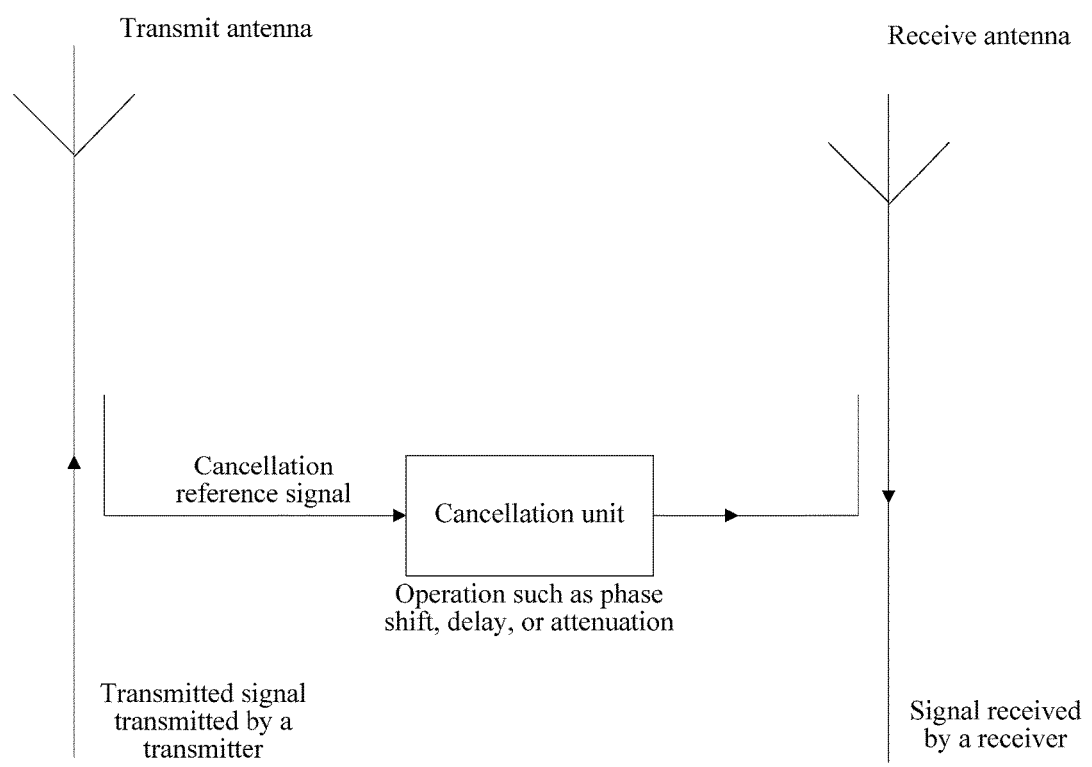
FIG. 1 is a schematic structural diagram of an interference cancellation apparatus in a conventional technology.
Figure 2:
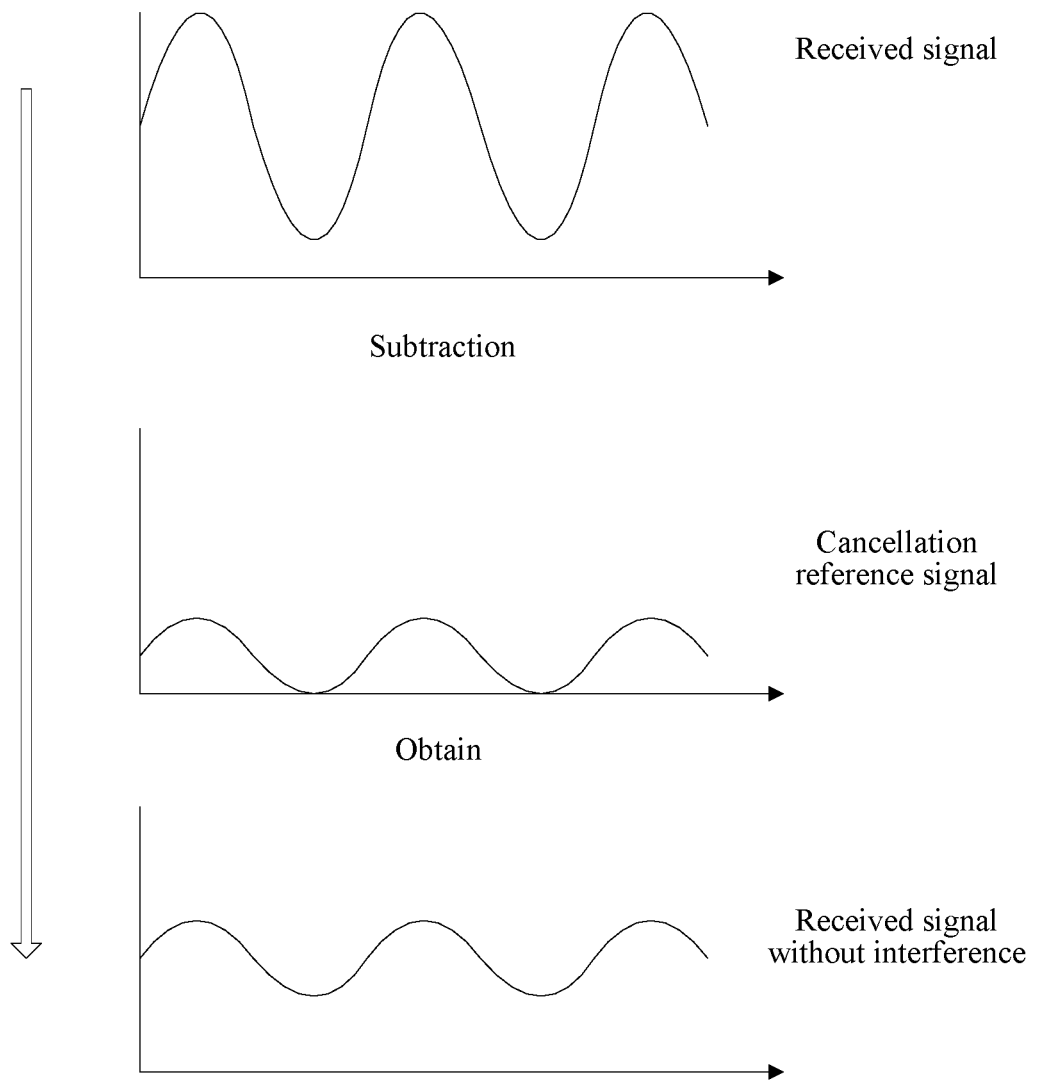
FIG. 2 is a schematic diagram of a principle for performing interference cancellation processing on a received signal in a conventional technology.
Figure 3:
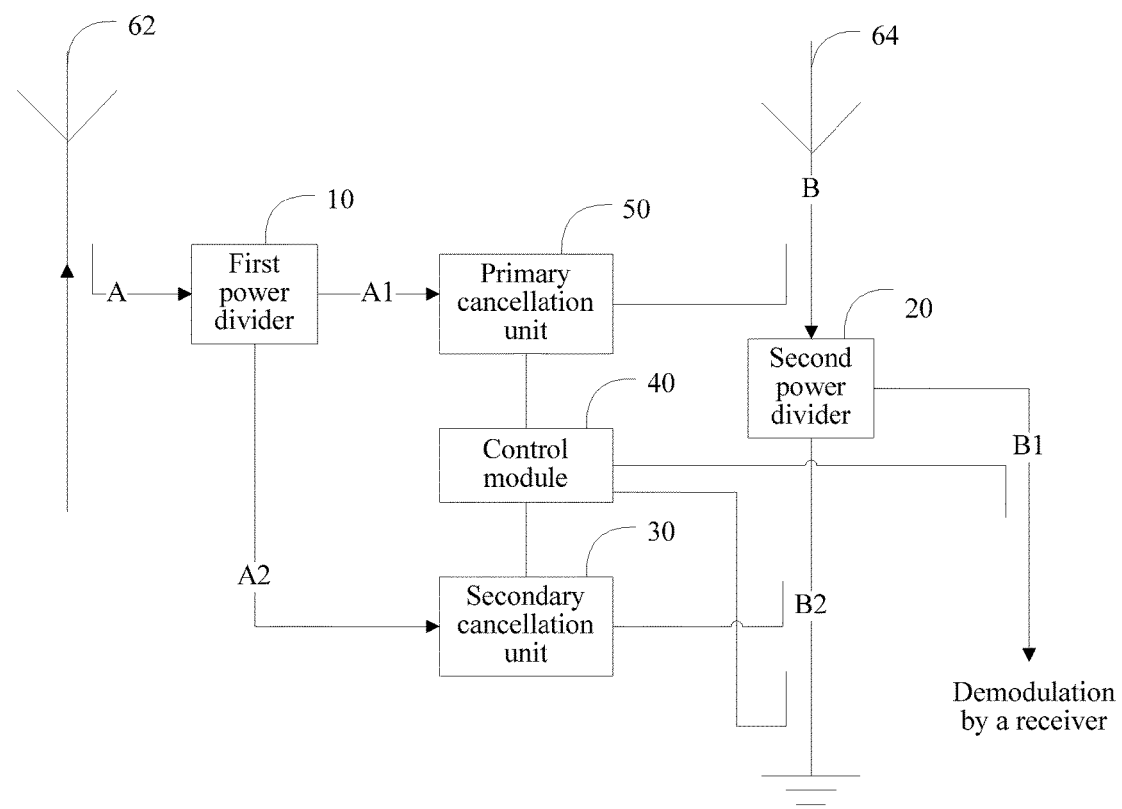
FIG. 3 is a schematic structural diagram of an interference cancellation apparatus of a first architecture in an embodiment of the present disclosure.

In an interference cancellation method in a conventional technology, a noise power may be temporarily increased when a phase, a delay, or an attenuation degree of a cancellation reference signal is adjusted, and consequently a communications system is unstable. To resolve the foregoing technical problem, an interference signal cancellation apparatus of a first architecture is particularly provided. As shown in FIG. 3, the interference signal cancellation apparatus of the first architecture includes a first power divider 10, a second power divider 20, a secondary cancellation unit 30, a control module 40, and a primary cancellation unit 50.

Specifically, the first power divider 10 is configured to divide a cancellation reference signal link A corresponding to a transmit antenna 62 into a first reference link A1 and a second reference link A2.

The cancellation reference signal link A is connected to the transmit antenna 62 by using a coupler and is connected to the first power divider. When transmitting a signal by using the transmit antenna 62, a transmitter may generate, on the cancellation reference signal link A by using the coupler, a cancellation reference signal corresponding to the transmitted signal. The first power divider 10 may divide the cancellation reference signal into two signals, and transmit the two signals to the primary cancellation unit 50 and the secondary cancellation unit 30 by using the first reference link A1 and the second reference link A2 respectively.

As shown in FIG. 3, the second power divider 20 is configured to: divide a signal receiving link B connected to a receive antenna 64 into a first receiving link B1 and a second receiving link B2, and use the first receiving link B1 as an output link.

The signal receiving link B is connected to the receive antenna 64, so that a signal received by the receive antenna 64 can be transmitted to the second power divider 20. The second power divider 20 may divide the signal transmitted through the signal receiving link B into two signals. One signal is a signal transmitted on the first receiving link B1 as an output to a receiver for demodulation, and the other signal is a signal on the second receiving link B2 for ground transmission.

The primary cancellation unit 50 is located at the first reference link A1, and is connected to the signal receiving link B by using a coupler. The primary cancellation unit 50 is configured to: receive a primary configuration parameter of the control module 40, and perform interference cancellation processing on a received signal on the signal receiving link B according to the primary configuration parameter and a cancellation reference signal on the first reference link A1, to generate a first signal without interference that is transmitted on the signal receiving link B.

The secondary cancellation unit 30 is located at the second reference link A2, and is connected to the second receiving link B2 by using a coupler. The secondary cancellation unit 30 is configured to: receive a secondary configuration parameter of the control module 40, and perform interference cancellation processing on a received signal on the second receiving link B2 according to the secondary configuration parameter and a cancellation reference signal on the second reference link A2, to generate a second signal without interference that is transmitted on the second receiving link B2.

The control module 40 is connected to the second receiving link B2, the secondary cancellation unit 30, and the primary cancellation unit 50. The control module 40 is configured to: generate the secondary configuration parameter; detect, after sending the secondary configuration parameter to the secondary cancellation unit, a power value of the second signal without interference and a power value of the first signal without interference; determine, according to the power value of the second signal without interference and the power value of the first signal without interference, whether the secondary cancellation unit can decrease the power value of the first signal without interference; if yes, generate an updated primary configuration parameter according to the secondary configuration parameter of the secondary cancellation unit and the primary configuration parameter of the primary cancellation unit; and send the updated primary configuration parameter to the primary cancellation unit.

The control module 40 may detect the power value of the second signal without interference that is on the second receiving link B2 and the power value of the first signal without interference that is on the first receiving link B1, the second receiving link B2, or the signal receiving link B. However, preferably, in this embodiment, the first signal without interference that is on the first receiving link B1 may be detected because the first signal without interference that is on the first receiving link B1 is an output signal. A power threshold may be generated according to the power value of the first signal without interference that is on the first receiving link B1, the second receiving link B2, or the signal receiving link B, it is determined whether the power value of the second signal without interference is less than the threshold, and if yes, it indicates that the secondary cancellation unit can decrease the power value of the first signal without interference. That is, a reverse interference cancellation signal applied by the secondary cancellation unit can cancel a part of a remaining interference signal in the first signal without interference, and therefore, can be applied to the primary cancellation unit 50. In another embodiment, the control module 40 may detect the power value of the first signal without interference that is on the second receiving link B2, and compare the power value of the first signal without interference with the power value of the second signal without interference that is on the second receiving link B2. If the power value of the second signal without interference is smaller, it indicates that the reverse interference cancellation signal applied by the secondary cancellation unit can cancel the part of the remaining interference signal in the first signal without interference, and therefore, can be applied to the primary cancellation unit 50.

After sending the updated primary configuration parameter to the primary cancellation unit, the control module 40 may update the secondary configuration parameter, and send an updated secondary configuration parameter to the secondary cancellation unit. That is, the control module 40 may repeatedly generate the secondary configuration parameter and send the secondary configuration parameter to the secondary cancellation unit, and then apply a preferred secondary configuration parameter with a relatively good cancellation effect to the primary cancellation unit.

As shown in FIG. 3, the secondary cancellation unit 30 is configured to: perform cancellation processing on the received signal on the second receiving link B2, and cancel interference noise in the received signal on the second receiving link B2 by subtracting the cancellation reference signal transmitted by using the second reference link A2 from the received signal on the second receiving link B2. Specifically, a cancellation reference signal with an equal amplitude and a reverse direction is inputted to the second receiving link B2 by using the coupler. The secondary cancellation unit 30 includes a tunable phase shifter, a tunable delayer, and/or a tunable attenuator, and the secondary configuration parameter sent by the control module 40 to the secondary cancellation unit 30 may include a configuration parameter of a value of the tunable phase shifter, the tunable delayer, and/or the tunable attenuator. The control module 40 stores multiple combinations of configuration parameters of values of the tunable phase shifter, the tunable delayer, and/or the tunable attenuator. Alternatively, the control module 40 may generate multiple combinations of configuration parameters of values of the tunable phase shifter, the tunable delayer, and/or the tunable attenuator according to an algorithm, where each combination is a group of configuration parameters. After the control module 40 sends the combination as the secondary configuration parameter to the secondary cancellation unit 30, the secondary cancellation unit 30 may apply the received secondary configuration parameter to the tunable phase shifter, the tunable delayer, and/or the tunable attenuator included in the secondary cancellation unit 30, so as to adjust the cancellation reference signal transmitted by using the second reference link A2.

After adjusting, according to the secondary configuration parameter, the cancellation reference signal transmitted by using the second reference link A2, the secondary cancellation unit 30 reversely outputs the cancellation reference signal to the second receiving link B2, and performs interference cancellation on the received signal on the second receiving link B2. After the second signal without interference that is transmitted on the second receiving link B2 is generated, the control module 40 may detect a power of the second signal without interference.

The control module 40 may detect the power value of the second signal without interference that is on the second receiving link B2 and the power value of the first signal without interference that is on the first receiving link B1, the second receiving link B2, or the signal receiving link B. However, preferably, in this embodiment, the first signal without interference that is on the first receiving link B1 may be detected because the first signal without interference that is on the first receiving link B1 is an output signal. A power threshold may be generated according to the power value of the first signal without interference that is on the first receiving link B1, the second receiving link B2, or the signal receiving link B, it is determined whether the power value of the second signal without interference is less than the threshold, and if yes, it indicates that the secondary cancellation unit can decrease the power value of the first signal without interference. That is, a reverse interference cancellation signal applied by the secondary cancellation unit can cancel a part of a remaining interference signal in the first signal without interference, and therefore, can be applied to the primary cancellation unit 50.

That is, the control module 40 may generate a group of configuration parameters as an initial value in advance by using an algorithm or search pre-stored configuration parameters for a group of configuration parameters as an initial value, and send the configuration parameters as the primary configuration parameter and the secondary configuration parameter to the primary cancellation unit 50 and the secondary cancellation unit 30 respectively. The primary cancellation unit 50 and the secondary cancellation unit 30 respectively set parameters of tunable phase shifters, tunable delayers, and/or tunable attenuators according to the primary configuration parameter and the secondary configuration parameter, and then perform interference cancellation on signals on the signal receiving link B and the second receiving link B2.

When detecting that the group of configuration parameters enables the power value of the second signal without interference that is on the second receiving link B2 to be less than the power value of the first signal without interference that is on the second receiving link B2, or finding, by using the power value of the second signal without interference that is on the second receiving link B2, that the secondary cancellation unit can decrease the power value of the first signal without interference that is on the first receiving link B1 or the signal receiving link, the control module 40 may apply the group of configuration parameters to the primary cancellation unit. In this case, the control module 40 may re-generate a group of configuration parameters or re-search the multiple pre-stored configuration parameters for a group of configuration parameters, and send the group of configuration parameters as the updated secondary configuration parameter to the secondary cancellation unit 30. The secondary cancellation unit 30 re-sets the tunable phase shifter, the tunable delayer, and/or the tunable attenuator according to the updated secondary configuration parameter, and then continues to perform interference cancellation on the signal on the second receiving link B2, to generate a new second signal without interference. In this case, the control module 40 may continuously detect a power of the first signal without interference and a power of the second signal without interference that is on the second receiving link B2, continuously compare and continuously update the secondary configuration parameter, and then send the secondary configuration parameter to the secondary cancellation unit.

Figure 4:
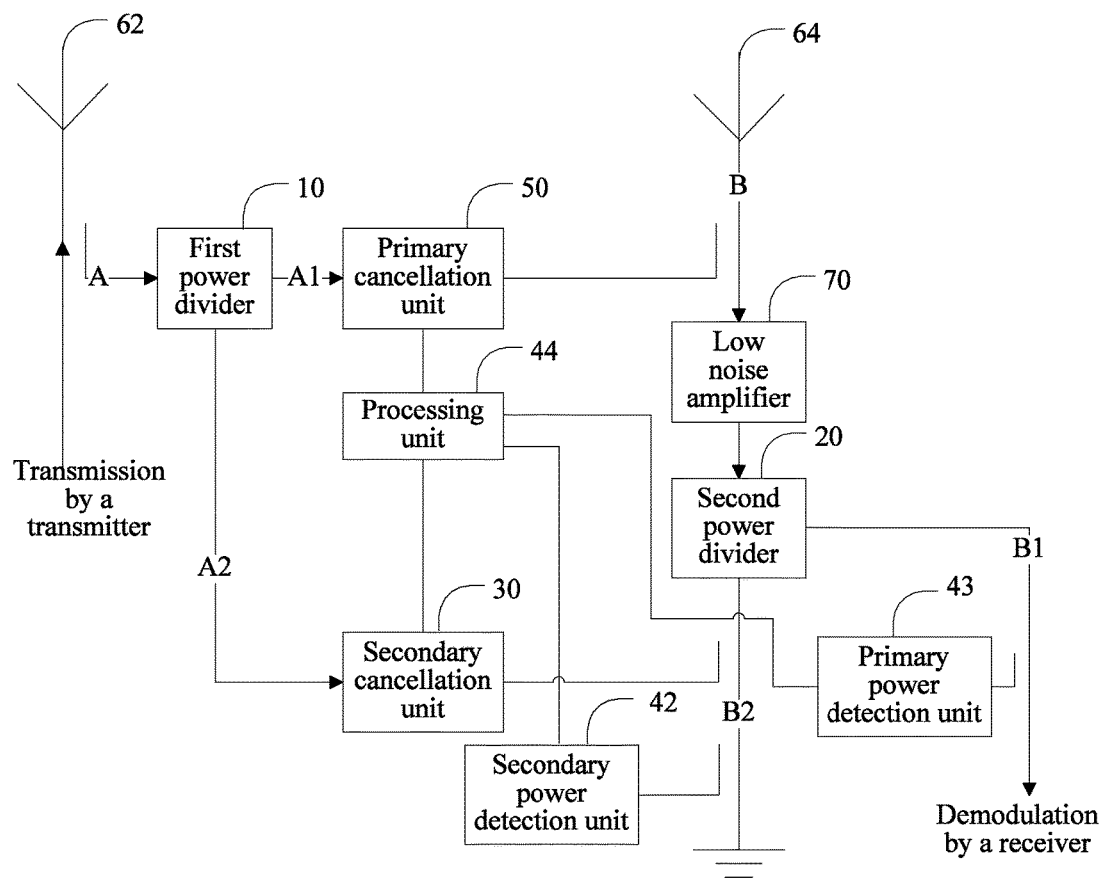
FIG. 4 is a schematic structural diagram of an interference cancellation apparatus of a first architecture in an embodiment of the present disclosure.

Specifically, in this embodiment, as shown in FIG. 4, the control module 40 includes a secondary power detection unit (Received Signal Strength Indicator (RSSI)) 42, a primary power detection unit 43, and a processing unit 44.

The secondary power detection unit 42 is connected to the second receiving link B2 by using a coupler, and is configured to: detect the power value of the second signal without interference that is transmitted on the second receiving link B2, and send the power value to the processing unit 44.

The primary power detection unit 43 may be connected to the first receiving link B1, the second receiving link B2, or the signal receiving link B by using a coupler, and is configured to: detect the power value of the first signal without interference that is transmitted on the first receiving link B1, the second receiving link B2, or the signal receiving link B, and send the power value to the processing unit 44. Preferably, as shown in FIG. 4, the primary power detection unit 43 may be connected to the first receiving link B1 by using a coupler.

As shown in FIG. 4, the secondary power detection unit 42 may obtain the power value of the second signal without interference by using the coupler, encode the power value by using a digital circuit, and then send an encoded power value to the processing unit 44.

The primary power detection unit 43 may obtain the power value of the first signal without interference by using the coupler, encode the power value by using a digital circuit, and then send an encoded power value to the processing unit 44.

The processing unit 44 is connected to the secondary power detection unit 42, the primary power detection unit 43, the primary cancellation unit 50, and the secondary cancellation unit 30. The processing unit 44 is configured to: generate the secondary configuration parameter; receive, after sending the secondary configuration parameter to the secondary cancellation unit, the power value of the second signal without interference that is detected by the secondary power detection unit 42 and the power value of the first signal without interference that is detected by the primary power detection unit 43; determine, according to the power value of the second signal without interference and the power value of the first signal without interference, whether the secondary cancellation unit can decrease the power value of the first signal without interference; if yes, generate the updated primary configuration parameter according to the secondary configuration parameter of the secondary cancellation unit and the primary configuration parameter of the primary cancellation unit; and send the updated primary configuration parameter to the primary cancellation unit 50. The primary cancellation unit 50 may set the tunable phase shifter, the tunable delayer, and/or the tunable attenuator according to the updated primary configuration parameter.

In this embodiment, the second signal without interference that is on the second receiving link B2 is obtained by means of cancellation jointly performed by the primary cancellation unit 50 and the secondary cancellation unit 30. In a process of re-calculating a group of configuration parameters according to the secondary configuration parameter corresponding to the secondary cancellation unit 30 and the primary configuration parameter corresponding to the primary cancellation unit 50, both the secondary configuration parameter on the secondary cancellation unit 30 and the primary configuration parameter on the primary cancellation unit 50 need to be considered. If it is determined, according to the received power value of the first signal without interference and the received power value of the second signal without interference, that the secondary cancellation unit 30 can decrease the power value of the first signal without interference, because the second signal without interference is obtained by means of cancellation jointly performed by the primary cancellation unit 50 and the secondary cancellation unit 30, the processing unit 44 may modify the primary configuration parameter in a phase, a delay, and an attenuation degree with reference to the secondary configuration parameter, to obtain the updated primary configuration parameter. After the updated primary configuration parameter is applied to the primary cancellation unit 50, the power value of the first signal without interference that serves as the output signal on the first receiving link B1 can be decreased.

For example, in free space, a signal of the transmit antenna is:

$$s(t)e^{j\omega_c t}.$$

In this case, an interference signal (an interference signal component in the received signal, where the received signal further includes a transmitted signal sent by a remote transmitter) received on the signal receiving link B may be:

$$A_0 s(t-\tau_0)e^{j(\omega_c(t-\tau_0)+\phi_0)} = A_0 e^{j(\phi_0 - \omega_c \tau_0)} s(t-\tau_0)e^{j\omega_c t}.$$

$\omega_c = 2\pi f_c$ is an angular frequency of the interference signal, $f_c$ is a signal carrier frequency, and $A_0$, $\varphi_0$, and $\tau_0$ respectively are an attenuation value, a phase shift value, and a delay value on an interference path.

$\varphi'_i = \varphi_i - \omega_c \tau_i$, i=0, 1, 2, . . . , and a factor $e^{j\omega_c t}$ is omitted in a subsequent formula derivation. In this case, the interference signal received by the antenna, that is, an interference signal at the primary cancellation unit is:

$$A_0 e^{j\varphi'_0} s(t-\tau_0).$$

It is assumed that when an interference signal is transmitted to the secondary cancellation unit by passing through a device such as a low noise amplifier (LNA) (only the attenuation is considered herein, and it is unimportant whether the LNA exists in a system) or a power divider, an attenuation, a phase shift, and a delay of the interference signal respectively are $A_3$, $\varphi_3$, and $\tau_3$. In this case, an interference signal at the secondary cancellation unit is:

$$A_0 A_3 e^{j(\varphi'_0+\varphi'_3)} s(t-\tau_0-\tau_3).$$

It is assumed that configuration parameters in the primary cancellation unit 50 for canceling the attenuation, the phase shift, and the delay of the interference signal respectively are $A_1$, $\varphi_1$, and $\tau_1$; and configuration parameters configured by the secondary cancellation unit to cancel the attenuation, the phase shift, and the delay of the interference signal respectively are $A_2$, $\varphi_2$, and $\tau_2$. In this case, when the primary cancellation unit cancels the interference signal, a relationship between the attenuation, the phase shift, and the delay satisfies:

$$\begin{cases} A_1 = A_0 \\ \varphi'_1 = \varphi'_0 \pm (2n+1)\pi, n = 0, 1, 2, \ldots \\ \tau_1 = \tau_0 \end{cases}$$

When the secondary cancellation unit 30 cancels the interference signal, a relationship between the attenuation, the phase shift, and the delay satisfies:

$$\begin{cases} A_2 = A_0 A_3 \\ \varphi'_2 = (\varphi'_0 + \varphi'_3) \pm (2m+1)\pi, m = 0, 1, 2, \ldots \\ \tau_2 = \tau_0 + \tau_3 \end{cases}$$

Therefore, it can be obtained that a parameter relationship between the primary configuration parameter of the primary cancellation unit 50 and the secondary configuration parameter of the secondary cancellation unit 30 is:

$$\begin{cases} A_1 = A_2/A_3 \\ \varphi'_1 = (\varphi'_2 - \varphi'_3) \pm 2k\pi, k = 0, 1, 2, \ldots \\ \tau_1 = \tau_2 - \tau_3 \end{cases}$$

That is:

$$\begin{cases} A_1 = A_2/A_3 \\ \varphi_1 = (\varphi_2 - \varphi_3) \pm 2k\pi, k = 0, 1, 2, \ldots \\ \tau_1 = \tau_2 - \tau_3 \end{cases}$$

That is, a group of configuration parameters may be recalculated according to the parameter relationship between the primary configuration parameter of the primary cancellation unit 50 and the secondary configuration parameter of the secondary cancellation unit 30, that is, according to the current primary configuration parameter of the primary cancellation unit 50 and the current secondary configuration parameter of the secondary cancellation unit 30, and then the configuration parameters are applied to the primary cancellation unit 50 as the primary configuration parameter.

Optionally, as shown in FIG. 4, the interference signal cancellation apparatus of the first architecture further includes a LNA 70. The LNA 70 is located at the signal receiving link B, and is connected to the second power divider 20 by using the signal receiving link B.

The LNA 70 is configured to: receive the first signal without interference that is obtained after the primary cancellation unit 50 performs interference cancellation processing and that is transmitted on the signal receiving link B, and perform low-noise amplification processing on the first signal without interference.

In FIG. 4, the LNA 70 is located on the signal receiving link B, and is located between the coupler connecting the primary cancellation unit 50 and the signal receiving link B and the second power divider 20. The signal received by the receive antenna generally has a relatively low power. Therefore, the signal needs to be amplified. When the LNA performs amplification processing, a power of noise generated in an amplification process is relatively low. Therefore, interference to an amplified signal is relatively small.

In addition, because the LNA is located between the primary cancellation unit and the second power divider, a signal entering the LNA is the first signal without interference that is obtained after the primary cancellation unit 50 performs interference cancellation processing and that is transmitted on the signal receiving link B, and relatively meets an adaptive signal range of the LNA. Therefore, the first signal without interference can be amplified relatively well.

In this embodiment, in the interference signal cancellation apparatus of the first architecture, the processing unit 44 is further configured to obtain a pre-stored modification parameter, and generate the updated primary configuration parameter with reference to the modification parameter according to the secondary configuration parameter of the secondary cancellation unit and the primary configuration parameter of the primary cancellation unit.

For example, in FIG. 4, a position of the coupler at a connecting point between the primary cancellation unit 50 and the signal receiving link B is different from a position of the coupler at a connecting point between the secondary cancellation unit 30 and the second receiving link B2. Therefore, when the primary cancellation unit 50 and the secondary cancellation unit 30 separately perform interference cancellation, signals processed by the primary cancellation unit 50 and the secondary cancellation unit 30 may have a phase difference. The phase difference depends on a wavelength of a carrier and a distance between the coupler of the primary cancellation unit 50 and the coupler of the secondary cancellation unit 30. For example, when the distance between the two couplers is equal to a half of the wavelength, the phase difference is 90 degrees. Besides, the phase difference of 90 degrees depends on the physical distance, and is a constant value.

When generating the updated primary configuration parameter, the processing unit 44 may modify the updated primary configuration parameter according to the modification parameter. In the foregoing example, the modification parameter is the phase difference of 90 degrees between the primary cancellation unit 50 and the secondary cancellation unit 30. In this case, if an adjustment parameter transmitted by the secondary cancellation unit 30 to the control module 40 is 45 degrees, after obtaining 135 degrees by adding 45 degrees to 90 degrees, the control module 40 sends a phase adjustment parameter of 135 degrees to the primary cancellation unit 50. The primary cancellation unit 50 may perform phase shift on the cancellation reference signal on the first reference link according to the phase value of 135 degrees.

For another example, the modification parameter may further include a gain/attenuation value. The gain/attenuation value reflects a difference of signal strengths on corresponding links when the primary cancellation unit 50 and the secondary cancellation unit 30 perform interference cancellation, and the difference is caused due to introduction of the amplifier and the power divider. The control module 40 may increase or decrease an attenuation degree in the adjustment parameter according to the gain/attenuation value, and then transmit the adjustment parameter to the primary cancellation unit 50.

Figure 5:
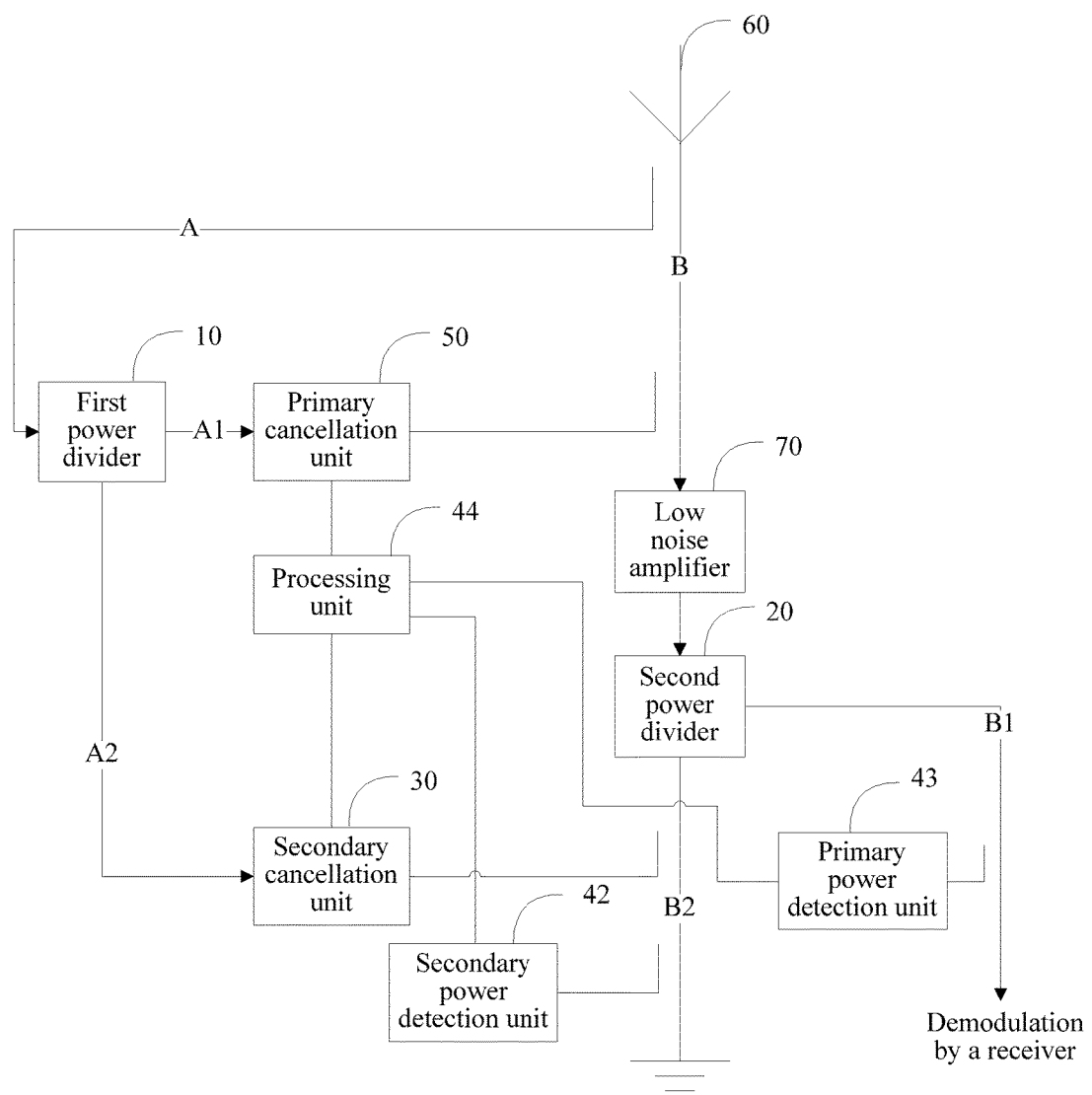
FIG. 5 is a schematic structural diagram of an interference cancellation apparatus of a first architecture in an embodiment of the present disclosure.

It should be noted that in this embodiment, the transmit antenna 62 and the receive antenna 64 may be antennas having independent physical architectures, and the transmit antenna 62 and the receive antenna 64 respectively refer to different physical antennas. However, in another embodiment, as shown in FIG. 5, the transmit antenna 62 and the receive antenna 64 may indicate functional classification of antennas, and may be a same physical antenna 60 in essence.

In addition, in an embodiment, the primary cancellation unit 50 and the secondary cancellation unit 30 may be different cancellation unit devices. For example, the primary cancellation unit 50 may include multiple parallel cancellation paths. A variable adjuster, a tunable delayer, and/or a tunable attenuator are disposed on each parallel cancellation path, and each cancellation path may independently correspond to a group of configuration parameters generated by the control module. The secondary cancellation unit 30 may include a different quantity of cancellation paths relative to the primary cancellation unit 50. The control module 40 may generate the secondary configuration parameter including multiple groups of configurations, and send the secondary configuration parameter to the secondary cancellation unit 30, and when detecting that the primary configuration parameter of the primary cancellation unit 50 needs to be updated, may apply the multiple groups of configurations serving as the secondary configuration parameter to some of the cancellation paths of the primary cancellation unit 50. When the primary configuration parameter is updated again subsequently, the multiple groups of configurations serving as the secondary configuration parameter may be applied to another cancellation path of the primary cancellation unit 50. That is, the quantities of cancellation paths included in the primary cancellation unit 50 and the secondary cancellation unit 30 may be different. This does not affect implementation of the present solution. The interference signal cancellation apparatus of the first architecture may be applied to an application scenario in which the primary cancellation unit 50 and the secondary cancellation unit 30 are different cancellation unit devices.

In an interference cancellation method in a conventional technology, a noise power may be temporarily increased when a phase, a delay, or an attenuation degree of a cancellation reference signal is adjusted, and consequently a communications system is unstable. To resolve the foregoing technical problem, on the basis of the foregoing interference signal cancellation apparatus of the first architecture, a first interference signal cancellation method is further provided.

Figure 6:
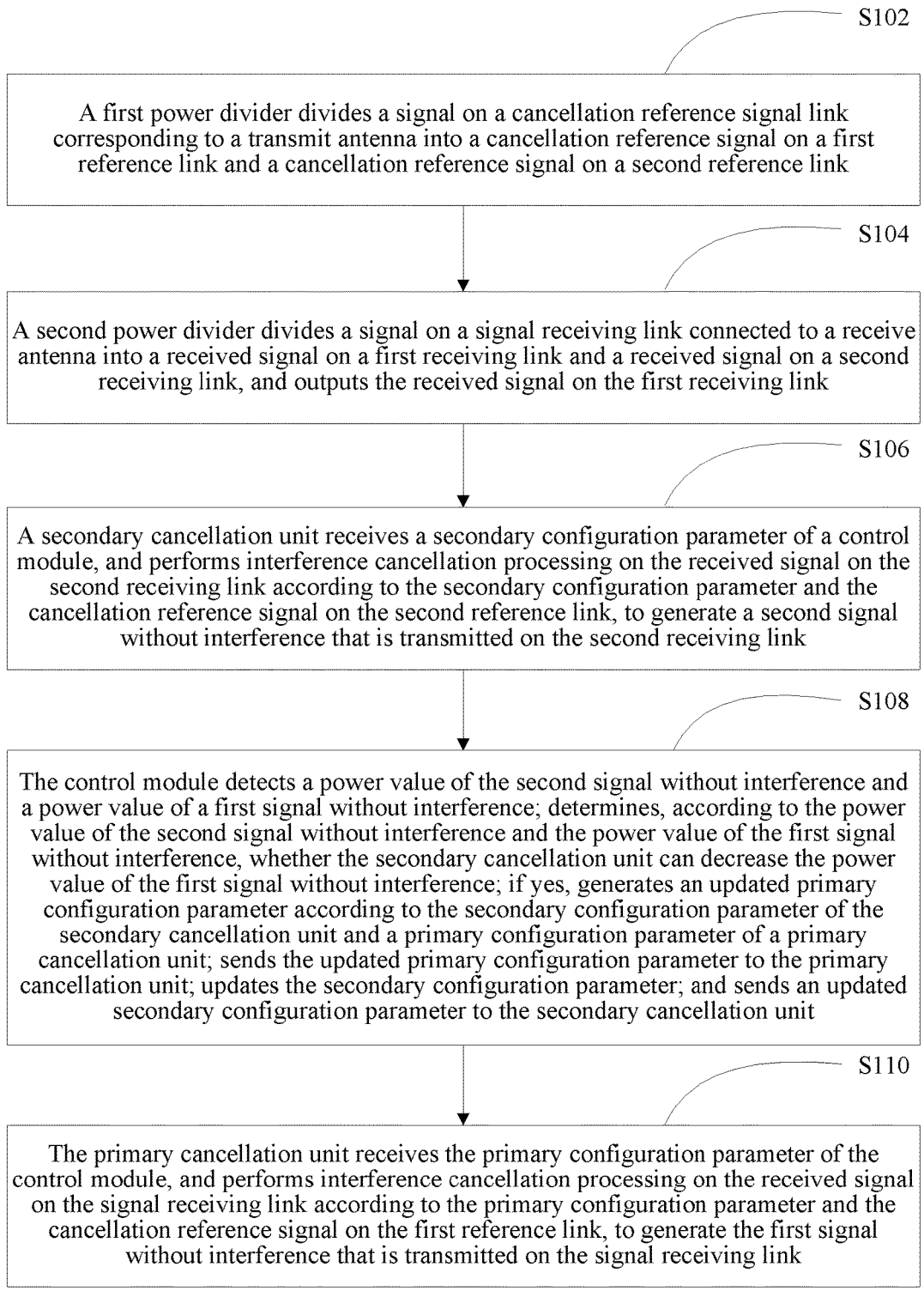
FIG. 6 is a flowchart of an interference cancellation method based on an interference cancellation apparatus of a first architecture in an embodiment of the present disclosure.

Specifically, as shown in FIG. 6, the following steps are included:

Step S102: A first power divider divides a signal on a cancellation reference signal link corresponding to a transmit antenna into a cancellation reference signal on a first reference link and a cancellation reference signal on a second reference link.

Step S104: A second power divider divides a signal on a signal receiving link connected to a receive antenna into a received signal on a first receiving link and a received signal on a second receiving link, and outputs the received signal on the first receiving link.

Step S106: A secondary cancellation unit receives a secondary configuration parameter of a control module, and performs interference cancellation processing on the received signal on the second receiving link according to the secondary configuration parameter and the cancellation reference signal on the second reference link, to generate a second signal without interference that is transmitted on the second receiving link.

Step S108: The control module detects a power value of the second signal without interference and a power value of a first signal without interference: determines, according to the power value of the second signal without interference and the power value of the first signal without interference, whether the secondary cancellation unit can decrease the power value of the first signal without interference; if yes, generates an updated primary configuration parameter according to the secondary configuration parameter of the secondary cancellation unit and a primary configuration parameter of a primary cancellation unit; sends the updated primary configuration parameter to the primary cancellation unit; updates the secondary configuration parameter; and sends an updated secondary configuration parameter to the secondary cancellation unit.

Step S110: The primary cancellation unit receives the primary configuration parameter of the control module, and performs interference cancellation processing on the received signal on the signal receiving link according to the primary configuration parameter and the cancellation reference signal on the first reference link, to generate the first signal without interference that is transmitted on the signal receiving link.

Optionally, after the primary cancellation unit generates the first signal without interference that is transmitted on the signal receiving link, a LNA may further receive the first signal without interference that is obtained after the primary cancellation unit performs interference cancellation processing and that is transmitted on the signal receiving link, and perform low noise amplification processing on the first signal without interference.

Optionally, the generating, by the control module, an updated primary configuration parameter according to the secondary configuration parameter of the secondary cancellation unit and a primary configuration parameter of a primary cancellation unit includes obtaining, by the control module, a pre-stored modification parameter, and generating the updated primary configuration parameter with reference to the modification parameter according to the secondary configuration parameter of the secondary cancellation unit and the primary configuration parameter of the primary cancellation unit.

Figure 7:
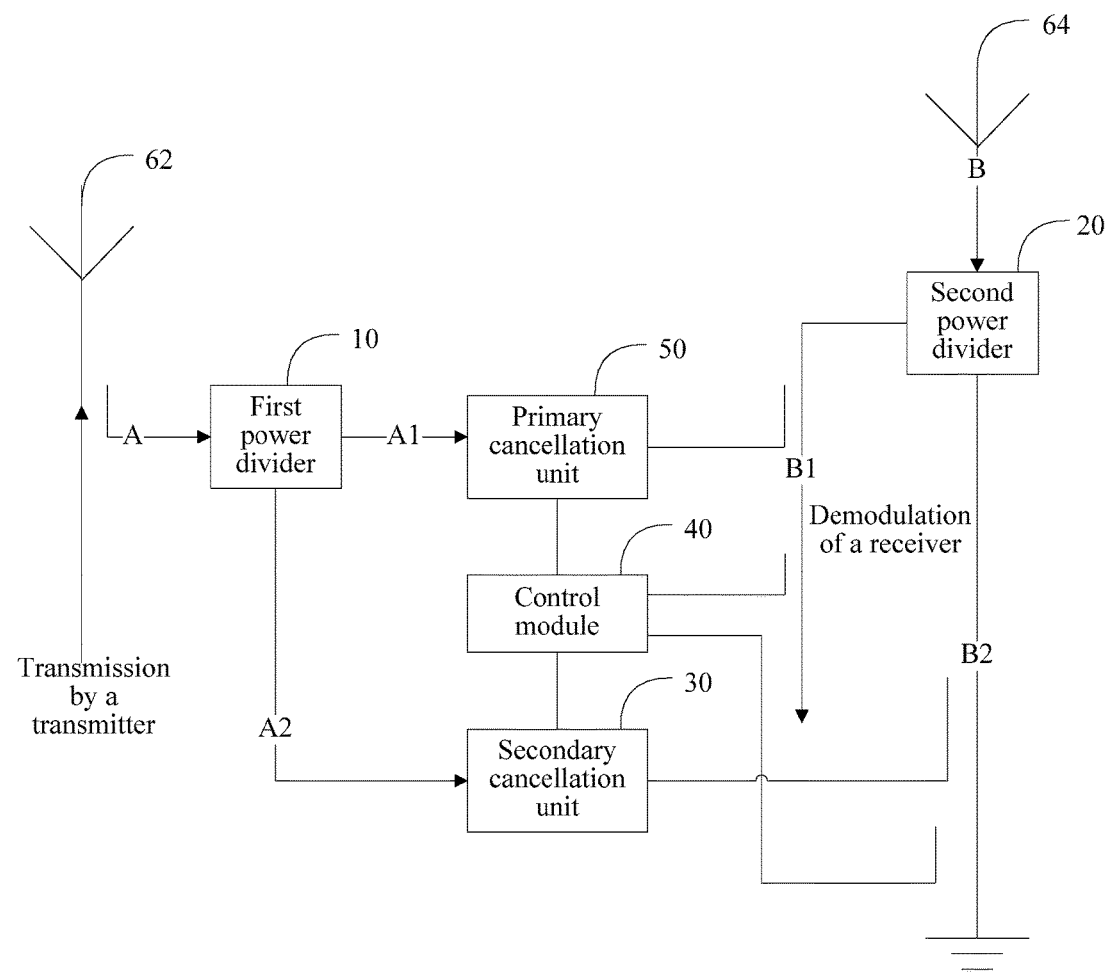
FIG. 7 is a schematic structural diagram of an interference cancellation apparatus of a second architecture in an embodiment of the present disclosure.

In an interference cancellation method in a conventional technology, a noise power may be temporarily increased when a phase, a delay, or an attenuation degree of a cancellation reference signal is adjusted, and consequently a communications system is unstable. To resolve the foregoing technical problem, an interference signal cancellation apparatus of a second architecture is particularly provided. As shown in FIG. 7, the interference signal cancellation apparatus of the second architecture includes a first power divider 10, a second power divider 20, a secondary cancellation unit 30, a control module 40, and a primary cancellation unit 50.

The first power divider 10 is configured to divide a cancellation reference signal link A corresponding to a transmit antenna 62 into a first reference link A1 and a second reference link A2.

The cancellation reference signal link A is connected to the transmit antenna 62 by using a coupler and is connected to the first power divider. When transmitting a signal by using the transmit antenna 62, a transmitter may generate, on the cancellation reference signal link A by using the coupler, a cancellation reference signal corresponding to the transmitted signal. The first power divider 10 may divide the cancellation reference signal into two signals, and transmit the two signals to the primary cancellation unit 50 and the secondary cancellation unit 30 by using the first reference link A1 and the second reference link A2 respectively.

As shown in FIG. 7, the second power divider 20 is configured to: divide a signal receiving link B connected to a receive antenna 64 into a first receiving link B1 and a second receiving link B2, and use the first receiving link B1 as an output link.

The signal receiving link B is connected to the receive antenna 64, so that a signal received by the receive antenna 64 can be transmitted to the second power divider 20. The second power divider 20 may divide the signal transmitted through the signal receiving link B into two signals. One signal is a signal transmitted on the first receiving link B1 as an output to a receiver for demodulation, and the other signal is a signal on the second receiving link B2 for ground transmission.

The primary cancellation unit 50 is located at the first reference link A1, and is connected to the first receiving link B1 by using a coupler. The primary cancellation unit 50 is configured to: receive a primary configuration parameter of the control module 40, and perform interference cancellation processing on a received signal on the first receiving link B1 according to the primary configuration parameter and a cancellation reference signal on the first reference link A1, to generate a first signal without interference that is transmitted on the first receiving link B1. The first signal without interference is an output signal, and may be transmitted to a receiver for demodulation.

The secondary cancellation unit 30 is located at the second reference link A2, and is connected to the second receiving link B2 by using a coupler. The secondary cancellation unit 30 is configured to receive a secondary configuration parameter of the control module 40, and perform interference cancellation processing on a received signal on the second receiving link B2 according to the secondary configuration parameter and a cancellation reference signal on the second reference link A2, to generate a second signal without interference that is transmitted on the second receiving link B2.

The control module 40 is connected to the second receiving link B2, the secondary cancellation unit 30, and the primary cancellation unit 50. The control module 40 is configured to: generate the secondary configuration parameter; detect, after sending the secondary configuration parameter to the secondary cancellation unit, a power value of the second signal without interference and a power value of the first signal without interference; determine, according to the power value of the second signal without interference and the power value of the first signal without interference, whether the secondary cancellation unit can decrease the power value of the first signal without interference; if yes, generate an updated primary configuration parameter according to the secondary configuration parameter of the secondary cancellation unit and the primary configuration parameter of the primary cancellation unit; and send the updated primary configuration parameter to the primary cancellation unit.

The control module 40 may detect the power value of the second signal without interference that is on the second receiving link B2 and the power value of the first signal without interference that is on the first receiving link B1. A power threshold may be generated according to the power value of the first signal without interference that is on the first receiving link B1, it is determined whether the power value of the second signal without interference is less than the threshold, and if yes, it indicates that the secondary cancellation unit can decrease the power value of the first signal without interference. That is, a reverse interference cancellation signal applied by the secondary cancellation unit can cancel a part of a remaining interference signal in the first signal without interference, and therefore, can be applied to the primary cancellation unit 50. In another embodiment, the control module 40 may detect the power value of the first signal without interference that is on the first receiving link B1, and compare the power value of the first signal without interference with the power value, on which allocation proportion conversion is performed by the second power divider, of the second signal without interference that is on the first receiving link B1, if the power value of the second signal without interference is smaller, it indicates that the reverse interference cancellation signal applied by the secondary cancellation unit can cancel the part of the remaining interference signal in the first signal without interference, and therefore, can be applied to the primary cancellation unit 50.

After sending the updated primary configuration parameter to the primary cancellation unit, the control module 40 may update the secondary configuration parameter, and send an updated secondary configuration parameter to the secondary cancellation unit. That is, the control module 40 may repeatedly generate the secondary configuration parameter and send the secondary configuration parameter to the secondary cancellation unit, and then apply a preferred secondary configuration parameter with a relatively good cancellation effect to the primary cancellation unit.

As shown in FIG. 7, the secondary cancellation unit 30 is configured to: perform cancellation processing on the received signal on the second receiving link B2, and cancel interference noise in the received signal on the second receiving link B2 by subtracting the cancellation reference signal transmitted by using the second reference link A2 from the received signal on the second receiving link B2. Specifically, a cancellation reference signal with an equal amplitude and a reverse direction is inputted to the second receiving link B2 by using the coupler. The secondary cancellation unit 30 includes a tunable phase shifter, a tunable delayer, and/or a tunable attenuator, and the secondary configuration parameter sent by the control module 40 to the secondary cancellation unit 30 may include a configuration parameter of a value of the tunable phase shifter, the tunable delayer, and/or the tunable attenuator. The control module 40 stores multiple combinations of configuration parameters of values of the tunable phase shifter, the tunable delayer, and/or the tunable attenuator. Alternatively, the control module 40 may generate multiple combinations of configuration parameters of values of the tunable phase shifter, the tunable delayer, and/or the tunable attenuator according to an algorithm, where each combination is a group of configuration parameters. After the control module 40 sends the combination as the secondary configuration parameter to the secondary cancellation unit 30, the secondary cancellation unit 30 may apply the received secondary configuration parameter to the tunable phase shifter, the tunable delayer, and/or the tunable attenuator included in the secondary cancellation unit 30, so as to adjust the cancellation reference signal transmitted by using the second reference link A2.

After adjusting, according to the secondary configuration parameter, the cancellation reference signal transmitted by using the second reference link A2, the secondary cancellation unit 30 reversely outputs the cancellation reference signal to the second receiving link B2, and performs interference cancellation on the received signal on the second receiving link B2. After the second signal without interference that is transmitted on the second receiving link B2 is generated, the control module 40 may detect a power of the second signal without interference.

The control module 40 may detect the power value of the second signal without interference that is on the second receiving link B2 and the power value of the first signal without interference that is on the first receiving link B1, the second receiving link B2, or the signal receiving link B. However, preferably, in this embodiment, the first signal without interference that is on the first receiving link B1 may be detected because the first signal without interference that is on the first receiving link B1 is an output signal. A power threshold may be generated according to the power value of the first signal without interference that is on the first receiving link B1, the second receiving link B2, or the signal receiving link B, it is determined whether the power value of the second signal without interference is less than the threshold, and if yes, it indicates that the secondary cancellation unit can decrease the power value of the first signal without interference. That is, a reverse interference cancellation signal applied by the secondary cancellation unit can cancel a part of a remaining interference signal in the first signal without interference, and therefore, can be applied to the primary cancellation unit 50.

That is, the control module 40 may generate a group of configuration parameters as an initial value in advance by using an algorithm or search pre-stored configuration parameters for a group of configuration parameters as an initial value, and send the configuration parameters as the primary configuration parameter and the secondary configuration parameter to the primary cancellation unit 50 and the secondary cancellation unit 30 respectively. The primary cancellation unit 50 and the secondary cancellation unit 30 respectively set parameters of tunable phase shifters, tunable delayers, and/or tunable attenuators according to the primary configuration parameter and the secondary configuration parameter, and then perform interference cancellation on signals on the first receiving link B1 and the second receiving link B2.

When detecting the group of configuration parameters and the power value of the second signal without interference that is on the second receiving link B2 and finding that the secondary cancellation unit can decrease the power value of the first signal without interference that is on the first receiving link B1, the control module 40 may apply the group of configuration parameters to the primary cancellation unit. In this case, the control module 40 may re-generate a group of configuration parameters or re-search the multiple pre-stored configuration parameters for a group of configuration parameters, and send the group of configuration parameters as the updated secondary configuration parameter to the secondary cancellation unit 30. The secondary cancellation unit 30 re-sets the tunable phase shifter, the tunable delayer, and/or the tunable attenuator according to the secondary configuration parameter, and then continues to perform interference cancellation on the signal on the second receiving link B2, to generate a new second signal without interference. In this case, the control module 40 may continuously detect a power of the first signal without interference that is on the first receiving link B1 and a power of the second signal without interference that is on the second receiving link B2, continuously compare and continuously update the secondary configuration parameter, and then send the secondary configuration parameter to the secondary cancellation unit.

When the control module 40 detects that the power of the second signal without interference that is on the second receiving link B2 belongs to a power threshold interval corresponding to the configuration parameters serving as the initial value, it indicates that interference cancellation can be relatively well implemented by using the group of the configuration parameters, and the group of configuration parameters may be applied to the primary cancellation unit. If it is detected that the power of the second signal without interference that is on the second receiving link B2 does not belong to the power threshold interval corresponding to the configuration parameters serving as the initial value, it indicates that the group of configuration parameters is not applicable to interference cancellation for the received signal. In this case, the control module 40 may re-generate a group of configuration parameters or re-search the multiple pre-stored configuration parameters for a group of configuration parameters, and send the group of configuration parameters as the updated secondary configuration parameter to the secondary cancellation unit 30. The secondary cancellation unit 30 re-sets the tunable phase shifter, the tunable delayer, and/or the tunable attenuator according to the secondary configuration parameter, and then continues to perform interference cancellation on the signal on the second receiving link B2, to generate a new second signal without interference. In this case, the control module 40 may continuously detect the power of the second signal without interference that is on the second receiving link B2, when detecting that the power does not belong to the corresponding power threshold interval, continuously update the secondary configuration parameter, and then send the secondary configuration parameter to the secondary cancellation unit.

Figure 8:
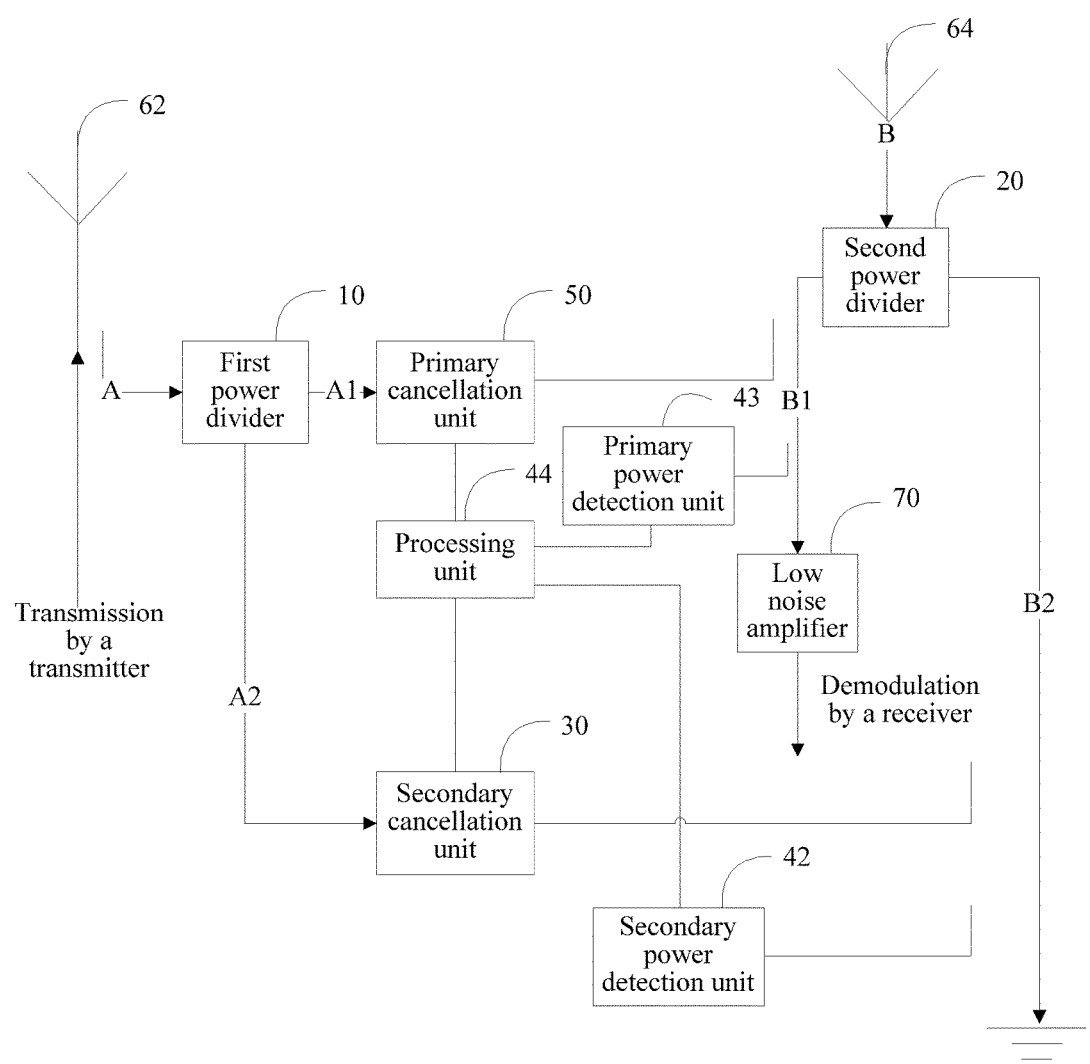
FIG. 8 is a schematic structural diagram of an interference cancellation apparatus of a second architecture in an embodiment of the present disclosure.

Specifically, in this embodiment, as shown in FIG. 8, the control module 40 includes a secondary power detection unit (RSSI) 42, a primary power detection unit 43, and a processing unit 44.

The secondary power detection unit 42 is connected to the second receiving link B2 by using a coupler, and is configured to detect the power value of the second signal without interference that is transmitted on the second receiving link B2, and send the power value to the processing unit 44.

The primary power detection unit 43 is connected to the first receiving link B1 by using a coupler, and is configured to: detect the power value of the first signal without interference that is transmitted on the first receiving link B1, and send the power value to the processing unit 44.

As shown in FIG. 8, the secondary power detection unit 42 may obtain the power value of the second signal without interference by using the coupler, encode the power value by using a digital circuit, and then send an encoded power value to the processing unit 44.

The primary power detection unit 43 may obtain the power value of the first signal without interference by using the coupler, encode the power value by using a digital circuit, and then send an encoded power value to the processing unit 44.

The processing unit 44 is connected to the secondary power detection unit 42, the primary power detection unit 43, the primary cancellation unit 50, and the secondary cancellation unit 30. The processing unit 44 is configured to: generate the secondary configuration parameter; receive, after sending the secondary configuration parameter to the secondary cancellation unit, the power value of the second signal without interference that is detected by the secondary power detection unit 42 and the power value of the first signal without interference that is detected by the primary power detection unit 43; determine, according to the power value of the second signal without interference and the power value of the first signal without interference, whether the secondary cancellation unit can decrease the power value of the first signal without interference; if yes, generate the updated primary configuration parameter according to the secondary configuration parameter of the secondary cancellation unit and the primary configuration parameter of the primary cancellation unit; and send the updated primary configuration parameter to the primary cancellation unit 50. The primary cancellation unit 50 may set the tunable phase shifter, the tunable delayer, and/or the tunable attenuator according to the updated primary configuration parameter.

As shown in FIG. 7, after the primary cancellation unit 50 generates the first signal without interference that is transmitted on the first receiving link B1 by means of interference cancellation, the first signal without interference may be transmitted to the receiver by using the first receiving link B1. The receiver may demodulate the first signal without interference, so as to obtain the received signal.

Optionally, as shown in FIG. 8, the interference signal cancellation apparatus of the second architecture further includes a LNA 70. The LNA 70 is located at the first receiving link B1, and a signal amplified by the LNA 70 may be transmitted to the receiver by using the first receiving link B1.

The LNA 70 is configured to receive the first signal without interference that is obtained after the primary cancellation unit 50 performs interference cancellation processing and that is transmitted on the first receiving link B1, and perform low-noise amplification processing on the first signal without interference.

In FIG. 8, the LNA 70 is located on the first receiving link B1, and is between the coupler connecting the first receiving link B1 and the receiver (not shown in the figure). The signal received by the receive antenna generally has a relatively low power. Therefore, the signal needs to be amplified. When the LNA performs amplification processing, a power of noise generated in an amplification process is relatively low. Therefore, interference to an amplified signal is relatively small.

In addition, because the LNA is located between the primary cancellation unit and the receiver (referring to FIG. 7 and FIG. 8), a signal entering the LNA is the first signal without interference that is obtained after the primary cancellation unit 50 performs interference cancellation processing and that is transmitted on the first receiving link B1, and relatively meets an adaptive signal range of the LNA. Therefore, the first signal without interference can be amplified relatively well.

In this embodiment, in the interference signal cancellation apparatus of the second architecture, the processing unit 44 is further configured to: obtain a pre-stored modification parameter, and generate the updated primary configuration parameter with reference to the modification parameter according to the secondary configuration parameter of the secondary cancellation unit and the primary configuration parameter of the primary cancellation unit.

For example, in FIG. 8, a position of the coupler at a connecting point between the primary cancellation unit 50 and the signal receiving link B is different from a position of the coupler at a connecting point between the secondary cancellation unit 30 and the second receiving link B2. Therefore, when the primary cancellation unit 50 and the secondary cancellation unit 30 separately perform interference cancellation, signals processed by the primary cancellation unit 50 and the secondary cancellation unit 30 may have a phase difference. The phase difference depends on a wavelength of a carrier and a distance between the coupler of the primary cancellation unit 50 and the coupler of the secondary cancellation unit 30. For example, when the distance between the two couplers is equal to a half of the wavelength, the phase difference is 90 degrees. Besides, the phase difference of 90 degrees depends on the physical distance, and is a constant value.

When generating the updated primary configuration parameter, the processing unit 44 may modify the updated primary configuration parameter according to the modification parameter. In the foregoing example, the modification parameter is the phase difference of 90 degrees between the primary cancellation unit 50 and the secondary cancellation unit 30. In this case, if an adjustment parameter transmitted by the secondary cancellation unit 30 to the control module 40 is 45 degrees, after obtaining 135 degrees by adding 45 degrees to 90 degrees, the control module 40 sends a phase adjustment parameter of 135 degrees to the primary cancellation unit 50. The primary cancellation unit 50 may perform phase shift on the cancellation reference signal on the first reference link according to the phase value of 135 degrees.

For another example, the modification parameter may further include a gain/attenuation value. The gain/attenuation value reflects a difference of signal strengths on corresponding links when the primary cancellation unit 50 and the secondary cancellation unit 30 perform interference cancellation, and the difference is caused due to introduction of the amplifier and the power divider. The control module 40 may increase or decrease an attenuation degree in the adjustment parameter according to the gain/attenuation value, and then transmit the adjustment parameter to the primary cancellation unit 50.

Figure 9:
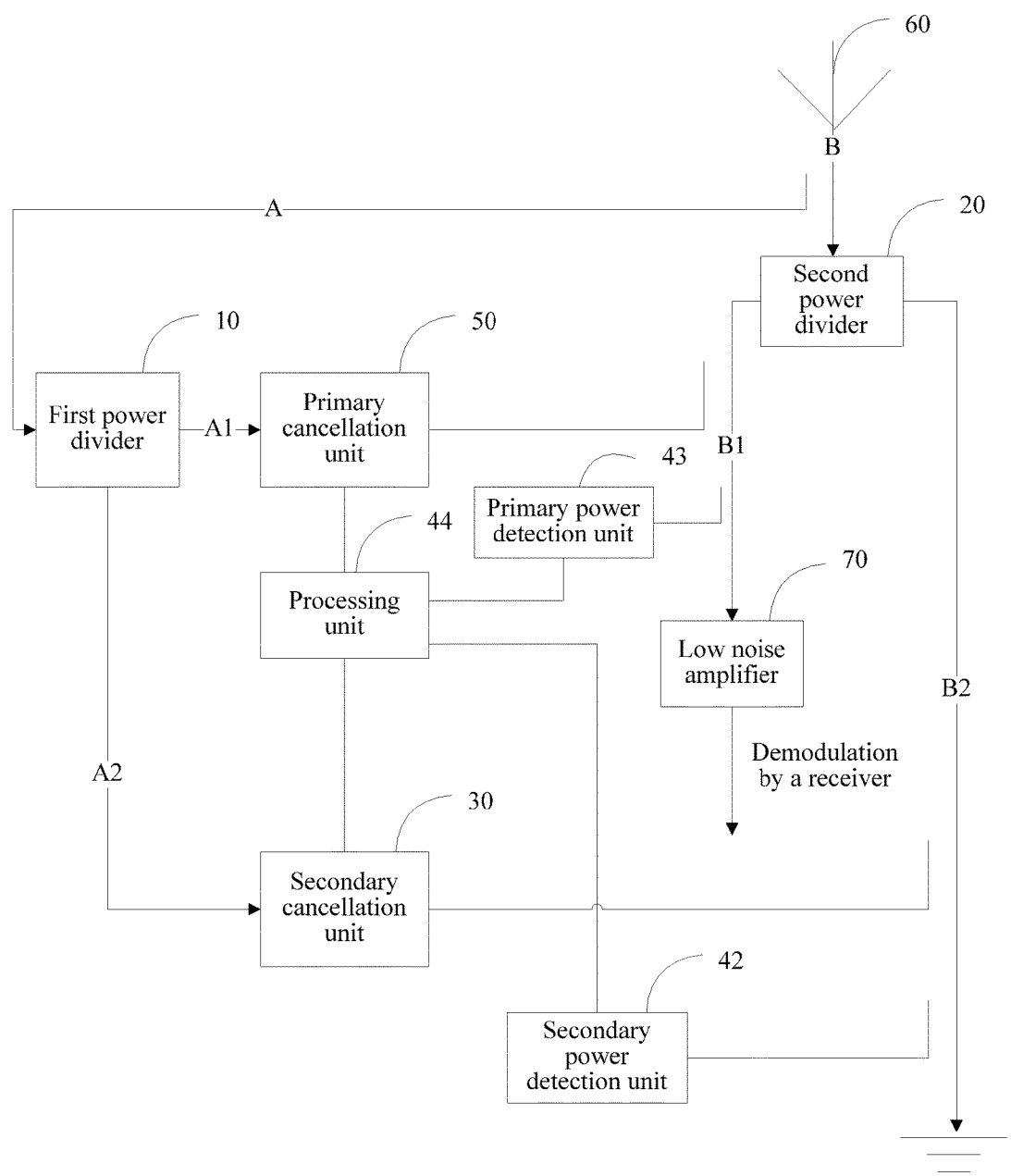
FIG. 9 is a schematic structural diagram of an interference cancellation apparatus of a second architecture in an embodiment of the present disclosure.

It should be noted that in this embodiment, the transmit antenna 62 and the receive antenna 64 may be antennas having independent physical architectures, and the transmit antenna 62 and the receive antenna 64 respectively refer to different physical antennas. However, in another embodiment, as shown in FIG. 9, the transmit antenna 62 and the receive antenna 64 may indicate functional classification of antennas, and may be a same physical antenna 60 in essence.

In an interference cancellation method in a conventional technology, a noise power may be temporarily increased when a phase, a delay, or an attenuation degree of a cancellation reference signal is adjusted, and consequently a communications system is unstable. To resolve the foregoing technical problem, on the basis of the interference signal cancellation apparatus of the foregoing second architecture, a second interference signal cancellation method is further provided.

Figure 10:
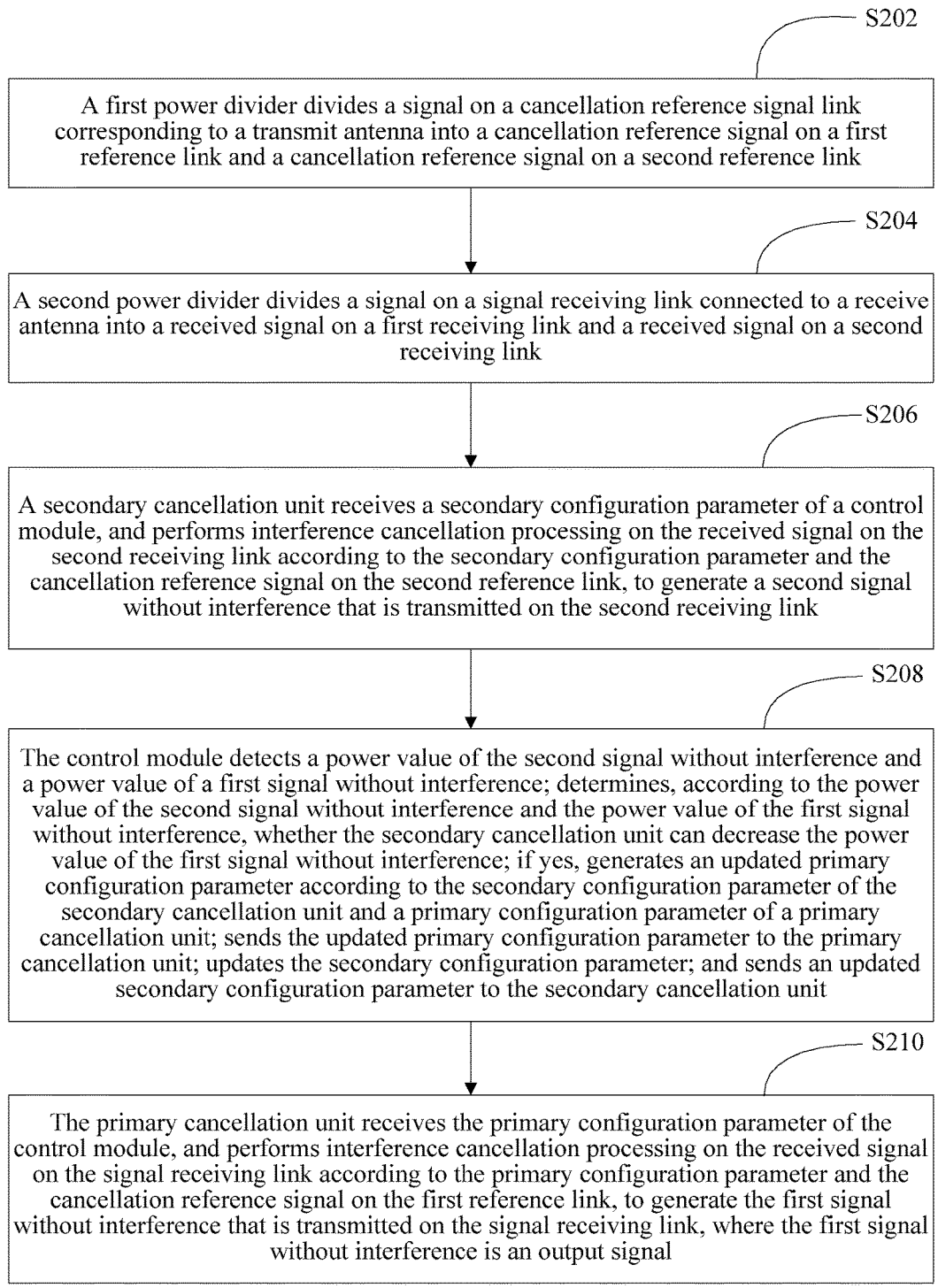
FIG. 10 is a flowchart of an interference cancellation method based on an interference cancellation apparatus of a second architecture in an embodiment of the present disclosure.

As shown in FIG. 10, the following steps are included.

Step S202: A first power divider divides a signal on a cancellation reference signal link corresponding to a transmit antenna into a cancellation reference signal on a first reference link and a cancellation reference signal on a second reference link.

Step S204: A second power divider divides a signal on a signal receiving link connected to a receive antenna into a received signal on a first receiving link and a received signal on a second receiving link.

Step S206: A secondary cancellation unit receives a secondary configuration parameter of a control module, and performs interference cancellation processing on the received signal on the second receiving link according to the secondary configuration parameter and the cancellation reference signal on the second reference link, to generate a second signal without interference that is transmitted on the second receiving link.

Step S208: The control module detects a power value of the second signal without interference and a power value of a first signal without interference: determines, according to the power value of the second signal without interference and the power value of the first signal without interference, whether the secondary cancellation unit can decrease the power value of the first signal without interference; if yes, generates an updated primary configuration parameter according to the secondary configuration parameter of the secondary cancellation unit and a primary configuration parameter of a primary cancellation unit; sends the updated primary configuration parameter to the primary cancellation unit; updates the secondary configuration parameter; and sends an updated secondary configuration parameter to the secondary cancellation unit.

Step S210: The primary cancellation unit receives the primary configuration parameter of the control module, and performs interference cancellation processing on the received signal on the signal receiving link according to the primary configuration parameter and the cancellation reference signal on the first reference link, to generate the first signal without interference that is transmitted on the signal receiving link, where the first signal without interference is an output signal.

Optionally, after the primary cancellation unit generates the first signal without interference transmitted on the first receiving link B1 as an output signal, the method further includes receiving, by a LNA, the first signal without interference that is obtained after the primary cancellation unit performs interference cancellation processing and that is transmitted on the signal receiving link, and performing low-noise amplification processing on the first signal without interference.

Optionally, the generating, by the control module, an updated primary configuration parameter according to the secondary configuration parameter of the secondary cancellation unit and a primary configuration parameter of a primary cancellation unit may be obtaining, by the control module, a pre-stored modification parameter, and generating the updated primary configuration parameter with reference to the modification parameter according to the secondary configuration parameter of the secondary cancellation unit and the primary configuration parameter of the primary cancellation unit.

It should be noted that a difference between the foregoing interference signal cancellation apparatus of the first architecture and the interference signal cancellation apparatus of the second architecture is: the positions of the couplers that couple the primary cancellation unit 50 to the received signal. In the interference signal cancellation apparatus of the first architecture, the primary cancellation unit 50 is coupled to the signal receiving link located at a front end of the second power divider; in the interference signal cancellation apparatus of the second architecture, the primary cancellation unit 50 is coupled to the first receiving link located at a back end of the second power divider.

In conclusion, implementation of the embodiments of the present disclosure may have the following beneficial effects:

In the foregoing interference signal cancellation apparatus of the first architecture or the second architecture or the interference signal cancellation method based on the foregoing interference signal cancellation apparatus of the first architecture or the second architecture, compared with the conventional technology, a secondary cancellation unit and a control module are added. In this way, when phase shift, time shift, or attenuation degree adjustment is performed on a cancellation reference signal on a first reference link, a primary cancellation unit always performs setting according to a preferred configuration parameter that has been applied to the secondary cancellation unit. A primary configuration parameter applied by the control module to the primary cancellation unit is a configuration parameter enabling a power of a signal without interference that is obtained by means of interference cancellation processing to decrease. Therefore, when the primary cancellation unit performs interference cancellation processing on a received signal, it is avoided that the power of the generated signal without interference is rapidly increased, and the power of the signal without interference falls within a relatively low threshold range. In addition, it is avoided that an excessively large power of an interference signal causes a back-end demodulation or amplification device to work abnormally, and consequently communication is interrupted. Therefore, in a communication process requiring relatively high reliability, a short communication interruption is avoided, so that stability of a communications system is greatly improved.

What are disclosed above are merely examples of embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. An interference signal cancellation apparatus, comprising:
   a controller;
   a first power divider coupled to the controller and configured to divide a cancellation reference signal link corresponding to a transmit antenna into a first reference link and a second reference link;
   a second power divider coupled to the controller and configured to:
      divide a signal receiving link into a first receiving link and a second receiving link that is coupled to the controller; and
      use the first receiving link as an output link;
   a primary canceller located at the first reference link and coupled to the controller and the signal receiving link, wherein the primary canceller is configured to:
      receive a primary configuration parameter of the controller; and
      perform interference cancellation processing on a received signal on the signal receiving link according to the primary configuration parameter and a cancellation reference signal on the first reference link to generate a first signal without interference that is transmitted on the signal receiving link; and
   a secondary canceller located at the second reference link and coupled to the controller and to the second receiving link, wherein the secondary canceller is configured to:
      receive a secondary configuration parameter of the controller; and
      perform interference cancellation processing on a received signal on the second receiving link according to the secondary configuration parameter and a cancellation reference signal on the second reference link to generate a second signal without interference that is transmitted on the second receiving link,
   wherein the controller is configured to:
      generate the secondary configuration parameter;
      detect, after sending the secondary configuration parameter to the secondary canceller, a power value of the second signal without interference and a power value of the first signal without interference;
      determine, according to the power value of the second signal without interference and the power value of the first signal without interference, whether the secondary canceller can decrease the power value of the first signal without interference;
      generate an updated primary configuration parameter according to the secondary configuration parameter of the secondary canceller and the primary configuration parameter of the primary canceller when the secondary canceller can decrease the power value of the first signal without interference; and
      send the updated primary configuration parameter to the primary canceller.

2. The interference signal cancellation apparatus according to claim 1, wherein the controller is further configured to:
   update the secondary configuration parameter after sending the updated primary configuration parameter to the primary canceller; and
   send an updated secondary configuration parameter to the secondary canceller.

3. The interference signal cancellation apparatus according to claim 1, wherein the controller further comprises:
   a secondary power detector coupled to the second receiving link;
   a primary power detector coupled to the first receiving link, the second receiving link, or the signal receiving link; and
   a processor coupled to the secondary power detector, the primary canceller, and the secondary canceller,
   wherein the secondary power detector is configured to:
      detect the power value of the second signal without interference that is transmitted on the second receiving link; and
      send the power value to the processor,
   wherein the primary power detector is configured to:
      detect the power value of the first signal without interference that is transmitted on the first receiving link, or the second receiving link, or the signal receiving link; and
      send the power value to the processor, and
   wherein the processor is configured to:

receive the power value of the second signal without interference that is detected by the secondary power detector and the power value of the first signal without interference that is detected by the primary power detector;

determine, according to the power value of the second signal without interference and the power value of the first signal without interference, whether the secondary canceller can decrease the power value of the first signal without interference;

generate the updated primary configuration parameter according to the secondary configuration parameter of the secondary canceller and the primary configuration parameter of the primary canceller when the secondary canceller can decrease the power value of the first signal without interference; and send the updated primary configuration parameter to the primary canceller.

4. The interference signal cancellation apparatus according to claim 3, wherein the processor is further configured to:

obtain a pre-stored modification parameter; and generate the updated primary configuration parameter with reference to the modification parameter according to the secondary configuration parameter of the secondary canceller and the primary configuration parameter of the primary canceller.

5. The interference signal cancellation apparatus according to claim 1, wherein the apparatus further comprises a low noise amplifier that is located at the signal receiving link and that is connected to the second power divider using the signal receiving link, and wherein the low noise amplifier is configured to:

receive the first signal without interference that is obtained after the primary canceller performs interference cancellation processing and that is transmitted on the signal receiving link; and perform low-noise amplification processing on the first signal without interference.

6. The interference signal cancellation apparatus according to claim 1, wherein the cancellation reference signal link is coupled to the transmit antenna and is coupled to the first power divider, and wherein the second power divider is connected to the receive antenna using the signal receiving link.

7. The interference signal cancellation apparatus according to claim 1, wherein the transmit antenna and the receive antenna are a same physical antenna.

8. An interference signal cancellation method, comprising:

dividing, by a first power divider, a signal on a cancellation reference signal link corresponding to a transmit antenna into a cancellation reference signal on a first reference link and a cancellation reference signal on a second reference link;

dividing, by a second power divider, a signal on a signal receiving link connected to a receive antenna into a received signal on a first receiving link and a received signal on a second receiving link;

outputting the received signal on the first receiving link;

receiving, by a secondary canceller, a secondary configuration parameter of a controller;

performing, by the secondary canceller, interference cancellation processing on the received signal on the second receiving link according to the secondary configuration parameter and the cancellation reference signal on the second reference link to generate a second signal without interference that is transmitted on the second receiving link;

detecting, by the controller, a power value of the second signal without interference and a power value of a first signal without interference;

determining, by the controller and according to the power value of the second signal without interference and the power value of the first signal without interference, whether the secondary canceller can decrease the power value of the first signal without interference;

generating, by the controller, an updated primary configuration parameter according to the secondary configuration parameter of the secondary canceller and a primary configuration parameter of a primary canceller when the secondary canceller can decrease the power value of the first signal without interference;

sending the updated primary configuration parameter to the primary canceller;

updating the secondary configuration parameter;

sending an updated secondary configuration parameter to the secondary canceller;

receiving, by the primary canceller, the primary configuration parameter of the controller; and performing interference cancellation processing on the received signal on the signal receiving link according to the primary configuration parameter and the cancellation reference signal on the first reference link to generate the first signal without interference that is transmitted on the signal receiving link.

9. The interference signal cancellation method according to claim 8, wherein the method further comprises:

receiving, by a low noise amplifier, the first signal without interference that is obtained after the primary canceller performs interference cancellation processing and that is transmitted on the signal receiving link; and performing low-noise amplification processing on the first signal without interference.

10. The interference signal cancellation method according to claim 8, wherein generating, by the controller, the updated primary configuration parameter according to the secondary configuration parameter of the secondary canceller and the primary configuration parameter of the primary canceller comprises:

obtaining, by the controller, a pre-stored modification parameter; and generating the updated primary configuration parameter with reference to the modification parameter according to the secondary configuration parameter of the secondary canceller and the primary configuration parameter of the primary canceller.

11. An interference signal cancellation apparatus, comprising:

a controller;

a first power divider coupled to the controller and configured to divide a cancellation reference signal link corresponding to a transmit antenna into a first reference link and a second reference link;

a second power divider coupled to the controller and configured to divide a signal receiving link connected to a receive antenna into a first receiving link and a second receiving link;

a primary canceller located at the first reference link and coupled to the controller and the first receiving link, wherein the primary canceller is configured to:

receive a primary configuration parameter of the controller; and perform interference cancellation processing on a received signal on the signal receiving link according to the primary configuration parameter and a cancellation reference signal on the first reference link to generate a first signal without interference that is transmitted on the signal receiving link, wherein the first signal without interference is an output signal;

a secondary canceller located at the second reference link and coupled to the controller and the second receiving link, wherein the secondary canceller is configured to:
receive a secondary configuration parameter of the controller; and
perform interference cancellation processing on a received signal on the second receiving link according to the secondary configuration parameter and a cancellation reference signal on the second reference link to generate a second signal without interference that is transmitted on the second receiving link, and wherein the controller is configured to:
generate the secondary configuration parameter;
detect, after sending the secondary configuration parameter to the secondary canceller, a power value of the second signal without interference and a power value of the first signal without interference;
determine, according to the power value of the second signal without interference and the power value of the first signal without interference, whether the secondary canceller can decrease the power value of the first signal without interference;
generate an updated primary configuration parameter according to the secondary configuration parameter of the secondary canceller and the primary configuration parameter of the primary canceller when the secondary canceller can decrease the power value of the first signal without interference; and
send the updated primary configuration parameter to the primary canceller.

12. The interference signal cancellation apparatus according to claim 11, wherein the controller is further configured to:
after sending the updated primary configuration parameter to the primary canceller, update the secondary configuration parameter; and
send an updated secondary configuration parameter to the secondary canceller.

13. The interference signal cancellation apparatus according to claim 11, wherein the controller further comprises:
a secondary power detector coupled to the second receiving link;
a primary power detector coupled to the first receiving link; and
a processor coupled to the secondary power detector, the primary canceller, and the secondary canceller,
wherein the secondary power detector is configured to:
detect the power value of the second signal without interference that is transmitted on the second receiving link; and
send the power value to the processor;
wherein the primary power detector is configured to:
detect the power value of the first signal without interference that is on the first receiving link; and
send the power value to the processor, and
wherein the processor is configured to:
receive the power value of the second signal without interference that is detected by the secondary power detector and the power value of the first signal without interference that is detected by the primary power detector;
determine, according to the power value of the second signal without interference and the power value of the first signal without interference, whether the secondary canceller can decrease the power value of the first signal without interference;
generate the updated primary configuration parameter according to the secondary configuration parameter of the secondary canceller and the primary configuration parameter of the primary canceller when the secondary canceller can decrease the power value of the first signal without interference; and
send the updated primary configuration parameter to the primary canceller.

14. The interference signal cancellation apparatus according to claim 13, wherein the processor is further configured to:
obtain a pre-stored modification parameter; and
generate the updated primary configuration parameter with reference to the modification parameter according to the secondary configuration parameter of the secondary canceller and the primary configuration parameter of the primary canceller.

15. The interference signal cancellation apparatus according to claim 11, wherein the apparatus further comprises a low noise amplifier located at the first receiving link, and wherein the low noise amplifier is configured to:
receive the first signal without interference that is obtained after the primary canceller performs interference cancellation processing and that is transmitted on the first receiving link and
perform low-noise amplification processing on the first signal without interference.

16. The interference signal cancellation apparatus according to claim 11, wherein the cancellation reference signal link is coupled to the transmit antenna and to the first power divider, and wherein the second power divider is connected to the receive antenna using the signal receiving link.

17. The interference signal cancellation apparatus according to claim 11, wherein the transmit antenna and the receive antenna are a same physical antenna.

18. An interference signal cancellation method, comprising:
dividing, by a first power divider, a signal on a cancellation reference signal link corresponding to a transmit antenna into a cancellation reference signal on a first reference link and a cancellation reference signal on a second reference link;
dividing, by a second power divider, a signal on a signal receiving link connected to a receive antenna into a received signal on a first receiving link and a received signal on a second receiving link;
receiving, by a secondary canceller, a secondary configuration parameter of a controller;
performing interference cancellation processing on the received signal on the second receiving link according to the secondary configuration parameter and the cancellation reference signal on the second reference link to generate a second signal without interference that is transmitted on the second receiving link;
detecting, by the controller, a power value of the second signal without interference and a power value of a first signal without interference;
determining, according to the power value of the second signal without interference and the power value of the first signal without interference, whether the secondary canceller can decrease the power value of the first signal without interference;

generating an updated primary configuration parameter according to the secondary configuration parameter of the secondary canceller and a primary configuration parameter of a primary canceller when the secondary canceller can decrease the power value of the first signal without interference;

sending the updated primary configuration parameter to the primary canceller;

updating the secondary configuration parameter;

sending an updated secondary configuration parameter to the secondary canceller;

receiving, by the primary canceller, the primary configuration parameter of the controller; and performing interference cancellation processing on the received signal on the first signal receiving link according to the primary configuration parameter and the cancellation reference signal on the first reference link to generate the first signal without interference that is transmitted on the first signal receiving link, wherein the first signal without interference is an output signal.

19. The interference signal cancellation method according to claim 18, wherein the method further comprises:

receiving, by a low noise amplifier, the first signal without interference that is obtained after the primary canceller performs interference cancellation processing and that is transmitted on the first receiving link; and performing low-noise amplification processing on the first signal without interference.

20. The interference signal cancellation method according to claim 18, wherein generating, by the controller, the updated primary configuration parameter according to the secondary configuration parameter of the secondary canceller and the primary configuration parameter of the primary canceller comprises:

obtaining, by the controller, a pre-stored modification parameter; and generating the updated primary configuration parameter with reference to the modification parameter according to the secondary configuration parameter of the secondary canceller and the primary configuration parameter of the primary canceller.

* * * * *